US011625621B2

(12) United States Patent
Pouyan et al.

(10) Patent No.: US 11,625,621 B2
(45) Date of Patent: Apr. 11, 2023

(54) DATA CLUSTERING

(71) Applicant: Accenture Global Solutions Limited, Dublin (IE)

(72) Inventors: Maziyar Baran Pouyan, Emeryville, CA (US); Yao A. Yang, San Francisco, CA (US); Saeideh Shahrokh Esfahani, Mountain View, CA (US); Andrew E. Fano, Lincolnshire, IL (US); David William Vinson, San Francisco, CA (US); Timothy M. Shea, Merced, CA (US)

(73) Assignee: Accenture Global Solutions Limited, Dublin (IE)

(*) Notice: Subject to any disclaimer, the term of this patent is extended or adjusted under 35 U.S.C. 154(b) by 465 days.

(21) Appl. No.: 16/744,506

(22) Filed: Jan. 16, 2020

(65) Prior Publication Data

US 2021/0224584 A1    Jul. 22, 2021

(51) Int. Cl.
| | | |
|---|---|---|
| *G06N 5/025* | (2023.01) | |
| *G06N 20/10* | (2019.01) | |
| *G06F 18/2323* | (2023.01) | |
| *G06F 18/214* | (2023.01) | |
| *G06F 18/2411* | (2023.01) | |
| *G06N 5/01* | (2023.01) | |

(52) U.S. Cl.
CPC ........... *G06N 5/025* (2013.01); *G06F 18/214* (2023.01); *G06F 18/2323* (2023.01); *G06F 18/2411* (2023.01); *G06N 5/01* (2023.01); *G06N 20/10* (2019.01)

(58) Field of Classification Search
CPC .. G06K 9/6224; G06K 9/6256; G06K 9/6269; G06N 20/10; G06N 20/20; G06N 5/003; G06N 5/025
See application file for complete search history.

(56) References Cited

U.S. PATENT DOCUMENTS

| | | |
|---|---|---|
| 2005/0189414 A1 | 9/2005 | Fano et al. |
| 2019/0019061 A1 | 1/2019 | Trenholm et al. |
| 2019/0147297 A1* | 5/2019 | Rogers .................. G06F 16/904 706/12 |
| 2021/0216813 A1 | 7/2021 | Pouyan et al. |

* cited by examiner

*Primary Examiner* — Ruiping Li
(74) *Attorney, Agent, or Firm* — Fish & Richardson P.C.

(57) ABSTRACT

Methods, systems, and apparatus, including computer programs encoded on a computer storage medium, for clustering data are disclosed. In one aspect, a method includes the actions of receiving feature vectors. The actions further include accessing rules that each relate one or more values of the feature vectors to a respective label of a plurality of labels. The actions further include, based on the rules, generating heuristics that each identify related values of the feature vectors. The actions further include, for each of the heuristics, generating a matrix that reflects a similarity of the feature vectors. The actions further include, based on the matrices that each reflects a respective similarity of the feature vectors, generating clusters that each include a subset of the feature vectors. The actions further include, for each cluster, determining a label of the plurality of labels.

20 Claims, 5 Drawing Sheets

DATA CLUSTERING

TECHNICAL FIELD

This disclosure generally relates to machine learning.

BACKGROUND

Machine learning is related to techniques that computer systems use to perform a specific task without using explicit instructions, relying on patterns and inference instead. Machine learning algorithms build a mathematical model based on sample data in order to make predictions or decisions without being explicitly programmed to perform the task.

SUMMARY

In order to take advantage of the power of machine learning, a system requires a large amount of data that is appropriately labeled in order to train a model. For example, if a system is training a model to distinguish between pictures of cats and dogs, then the training data should include pictures of cats and pictures of dogs. The system may also require that each picture be labeled as including a cat or including a dog. When data sets grow in size and complexity and the number of labels also grows, accessing data that is already labeled can be challenging.

To overcome this challenge, it is helpful to be able to cluster the unlabeled data into similar groups. Each group can then be labeled more efficiently. To cluster the unlabeled data, a system accesses a series of rules that relate the fields of the data to certain labels. For example, a high value in one field may suggest that the corresponding data be labeled a certain way. The system generates a series of heuristics based on these rules. The system performs random forest similarity learning to generate a matrix for each heuristic. The system combines these matrices and performs graph-based clustering. The distinct clusters may be apparent from the graph, and the system receives a label for each cluster.

According to an innovative aspect of the subject matter described in this application, a method for clustering data includes the actions of receiving, by a computing device, feature vectors; accessing, by the computing device, rules that each relate one or more values of the feature vectors to a respective label of a plurality of labels; based on the rules that each relate the one or more values of the feature vectors to the respective label, generating, by the computing device, heuristics that each identify related values of the feature vectors; for each of the heuristics, generating, by the computing device, a matrix that reflects a similarity of the feature vectors; based on the matrices that each reflects a respective similarity of the feature vectors, generating, by the computing device, clusters that each include a subset of the feature vectors; and, for each cluster, determining, by the computing device, a label of the plurality of labels.

These and other implementations can each optionally include one or more of the following features. The operations further include training, by the computing device, a model using machine learning, the feature vectors, and the determined labels. The action of generating the heuristics that each identify related values of the feature vectors includes, based on the rules that each relate the one or more values of the feature vectors to the respective label, generating a first group of heuristics; and, based on the first group of heuristics, generating a second group of heuristics, wherein the heuristics include the first group of heuristics and the second group of heuristics. The action of generating the second group of heuristics includes, based on the first group of heuristics, generating a graph that includes a node for each value of the feature vectors and edges that connect one or more values of each rule; identifying groups of nodes connected through intervening nodes; and generating the second group of heuristics based on the groups of nodes connected through the intervening nodes.

The action of accessing the rules that each relate the one or more values of the feature vectors to the respective label of the plurality of labels includes receiving the rules that each relate the one or more values of the feature vectors to the respective label of the plurality of labels from an additional computing device. The action of determining the label of the plurality of labels includes receiving, from the additional computing device, the label of the plurality of labels. The matrix that reflects a similarity of the feature vectors has a number of rows and columns that equal a quantity of the feature vectors. The matrix that reflects the similarity of the feature vectors is generated using random forest similarity. The action of generating the matrix that reflects the similarity of the feature vectors includes, for each of the heuristics, generating a manifold of numerical values of the related values; and generating the matrix that reflects the similarity of the feature vectors based on the manifold of the numerical values of the related values.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A system is able to cluster data more efficiently. The clustered data may be easier to label.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
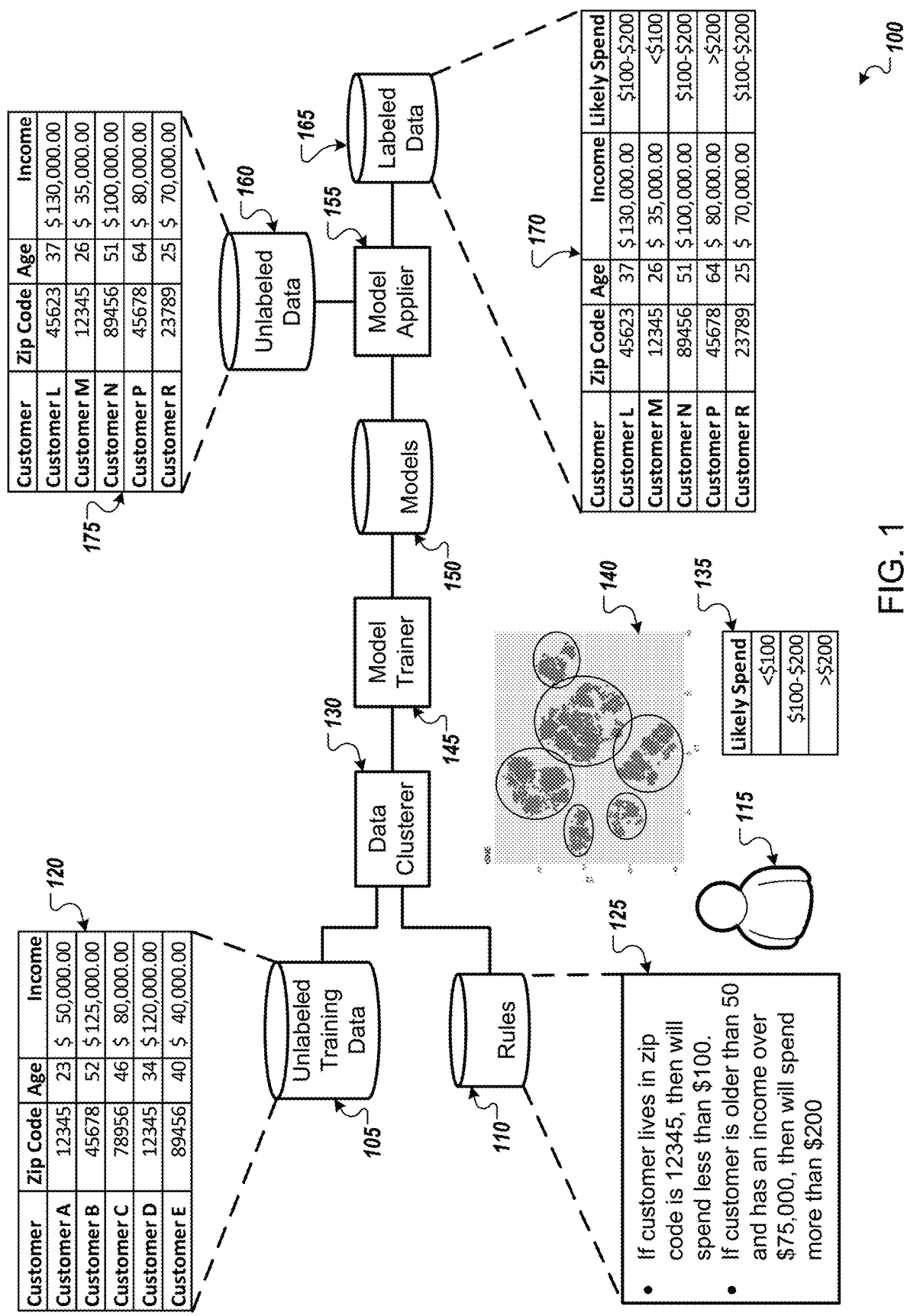
FIG. 1 illustrates an example system labeling data for use in a machine learning system.

FIG. 1 illustrates an example system 100 labeling data for use in a machine learning system. Briefly, and as described in more detail below, the system 100 receives unlabeled training data 105 that, to be used in a machine learning process, should include labels for each portion of the data. The system 100 receives a series of rules 110 that specify relationships between different portions of the data. Based on those rules, the system 100 clusters the unlabeled training data 105 and receives a label for each cluster. With the unlabeled training data 105 now labeled, the system 100 trains a model 150 using machine learning and uses the model to assign labels to additional unlabeled data 160.

In more detail, the system 100 receives unlabeled training data 105 that includes a series of vectors 120. Each vector includes a number of fields that each include a value. The value may be represented by a number or text. In this example, each vector represents a customer. Each customer vector includes values for the zip code field, the age field, and the income field. Customer A may live in the zip code 12345, be twenty-three years old, and have an annual income of $50,000. The vectors 120 includes similar vectors for Customers B, C, D, and E.

Some of these customers may spend different amounts of money in a store each month. Some may spend less than $100. Some may spend between $100 and $200. Some may spend more than $200. It would be helpful to identify the level of likely spending for each customer to create effective marketing campaigns. It would be helpful to use a machine learning process to identify the likely spending level for each customer, but without spending data for each customer, it is difficult to train a machine learning model to identify a likely spending level for a customer based on zip code, age, and income.

To assign labels to the unlabeled training data 105, the system receives rules 110. In some implementations, the user 115 may provide the rules 110 to the system 100. The user 115 may be an expert in a field related to the unlabeled training data 105. The user 115 may provide rules 110 that indicates some relationships between the values in each field and the likely spending level for the customer with those values. The system 100 may not implement the rules 110 in an absolute fashion. Instead, the system 100 uses the rules to more effectively cluster the unlabeled training data 105 into similar clusters. In some implementations, the system 100 may generate the rules 110 automatically. For example, the system may analyze other sources of data to identify relationships between various values of fields and spending.

In the example of FIG. 1, the rules 110 include example rules 125. A first example rule indicates that if a customer lives in zip code 12345, then that customer is likely to spend less than $100. A second example rule indicates that if a customer is older than fifty and has an income over $75,000, then that customer is likely to spend more than $200. The rules 110 may include some contradictions such that it may be possible to identify a customer that fits more than one rule that each specifies different spending levels. For example, a customer may live in zip code 12345, be older than fifty, and have an income over $75,000. This contraction is not an issue for the system 100 because the system does not implement the rules 110 directly. Instead, the system 100 uses the rules to identify related clusters of the unlabeled training data 105.

The system 100 includes a data clusterer 130 that is configured to use the rules 110 to cluster the unlabeled training data 105 into similar clusters. The data clusterer 130 identifies heuristics based on the rules 110. Some of these heuristics may be directly derived from the rules 110 while others may be inferred. For each of the heuristics, the data clusterer 130 generates a similarity matrix that reflects relationships between each of the vectors in the unlabeled training data 105. Based on these similarity matrices, the data clusterer 130 identifies clusters of the unlabeled training data 105. In some implementations, the user 115 may assign a label to each one of the clusters. In some implementations, the data clusterer 130 may assign a label automatically to each cluster.

In the example of FIG. 1, the data clusterer 130 identifies the data clusters illustrated in the graph 140. The user 115 may assign a label from example labels 135 to each cluster. More than one cluster may be assigned the same label. For example, two clusters may be assigned the likely to spend less than $100 label. The data clustering process will be described in more detail with respect to FIGS. 2A and 2B.

With the unlabeled training data 105 now labeled, the system provides the labeled training data to the model trainer 145. The model trainer 145 is configured to train a model 150 using machine learning and the labeled training data. The model trainer 145 trains the model 150 such that the model 150 is configured to receive a zip code, age, and income for a customer and output whether the customer is likely to spend less than $100, more than $200, or between $100 and 200.

The model trainer 145 stores the model 150 along with other models trained on other training data labeled by the system 100. The model applier 155 provides unlabeled data 160 as an input to the model 150 to generate labeled data 165.

In the example of FIG. 1, the example unlabeled data 175 includes data for five customers. Customer L lives in zip code 45623, is 37 years old, and has an income of $130,000. The example unlabeled data 175 also includes data for customers M, N, P, and R. The model applier 155 selects, from the models 150, the model trained to identify the likely spending of a customer based on an input of zip code, age, and income. The model applier 155 provides the example unlabeled data 175 as an input to the selected model. The model outputs the example labeled data 170 that includes labels for each of the customers L, M, N, P, and R. For example, the model outputs that customer N is likely to spend between $100 and $200 dollars.

If the system 100 applied the example rules 125 to the example unlabeled data 175, then the label for customer N would be different than likely to spend between $100 and $200 dollars. Instead, the system 100 would apply the label of likely to spend over $200 because customer N is over 50 and has an income over $75,000. However, because the rules 110 influence the model 150 instead of the system 100 merely implementing the rules 110, there will be instances where the labels generated by the model contradict the rules 110.

In some implementations, the system 100 may receive additional data after the customers have finished their purchases and the total spent by each customer is known. The system 100 may receive this data, and the model trainer 145 may update the model if there are some totals that do not match the labels identified by the model. For example, customer P may have spent $150. The model trainer 145 may receive this data, update the training data, and use machine learning to update the model. In some instances, the system 100 may include the data for each customer and the totals spent in the training data.

In some implementations, the user 115 may provide the rules 110 and the labels for the clusters 140 directly to the system 100. The system 100 may include one or more computing devices. In some implementations, the user 115 may provide the rules 110 and the labels for the clusters 140 to the system 100 through a different computing device. For example, the user 115 may provide the rules 110 and the labels for the clusters 140 to a mobile device. The mobile device may provide the rules 110 and the labels for the clusters 140 to the system 100.

Figure 2A:
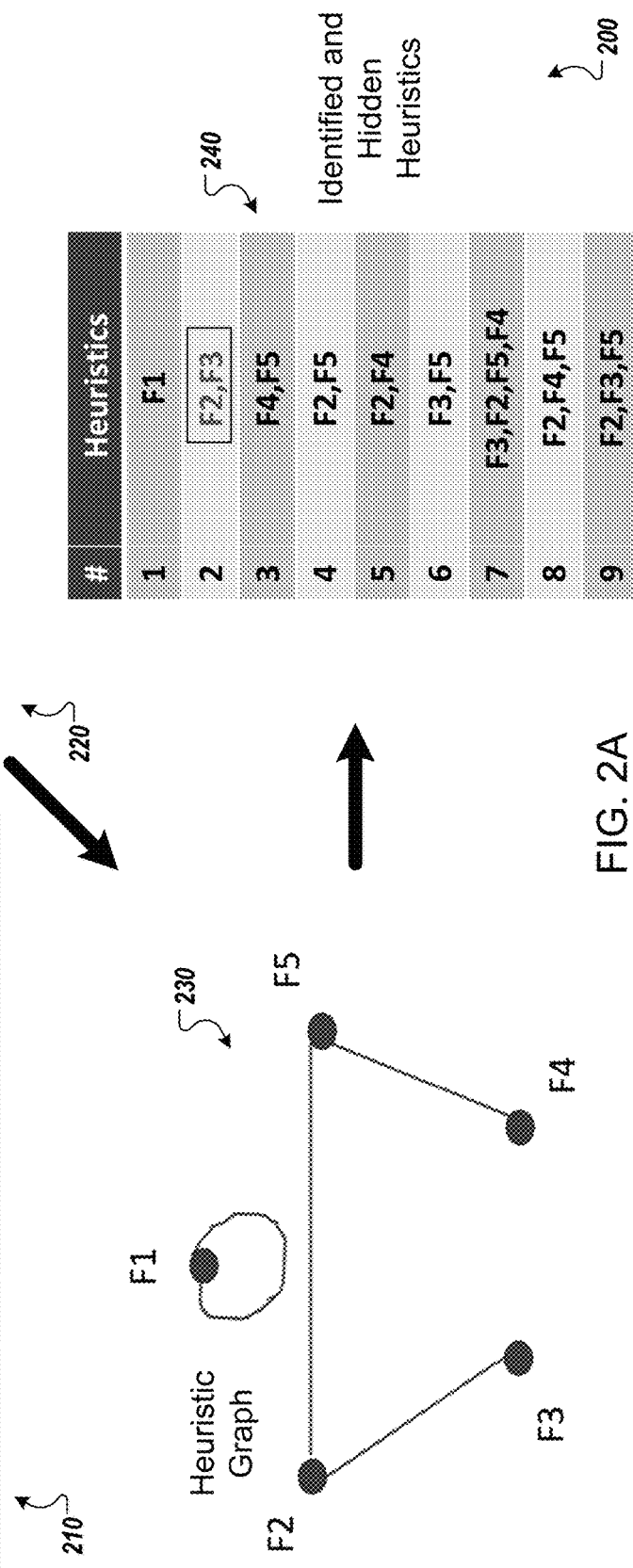
FIGS. 2A and 2B illustrate an example system for labeling data based on received heuristics.
Figure 2B:
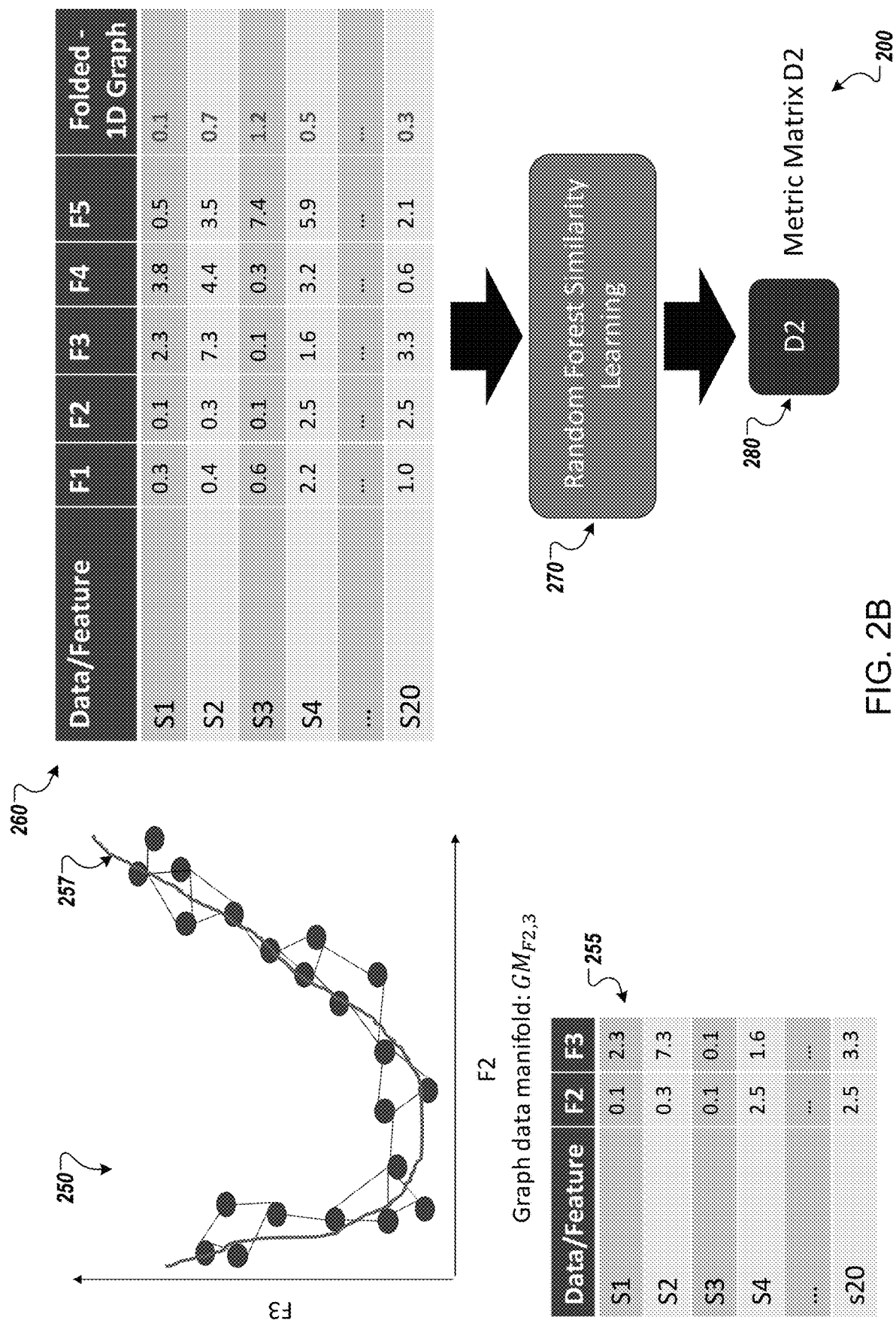

FIGS. 2A and 2B illustrate an example process 200 for labeling data based on received heuristics. The process 200 illustrates how the data clusterer 130 uses the rules 110 to generate the clusters 140. The process 200 may be performed by one or more computing devices, for example, the system 100 as shown in FIG. 1.

The process 200 of labeling training data begins with receiving the unlabeled training data 210. The unlabeled training data 210 includes a number of feature vectors that each include a numerical value for each field, or value, of the feature vector. For example, the unlabeled training data 210 includes a feature vector S3 with the numerical values of (0.6, 0.1, 0.1, 0.3, 7.4). The unlabeled training data 210 includes twenty vectors in total. In some instances, the unlabeled training data 210 may include many more feature vectors, each with many more fields. For, example, the unlabeled training data 210 may include ten thousand feature vectors that each include two hundred fields. The unlabeled training data 210 may be similar to the example unlabeled training data 120 of FIG. 1, but where the numbers are translated to a scale, such as between 0 and 1. In some instances, the numerical values of the fields in the unlabeled training data 210 represent text.

The process 200 receives rules and translates those rules to the heuristic table 220. The process 200 may receive the rules from a user, from another computing device, and/or generate the rules automatically. For example, the process 200 may receive a rule that if F1 is high, then the feature vector should be labeled as class B. Another rule may state that if F2 is high and F3 is low, then the feature vector should be labeled as class A. In some instances, the high and low designators may correspond to a threshold. For example, for a numerical value of a field to be high, the numerical value should be greater than 0.8. For a numerical value of a field to be low, the low, the numerical value should be less than 0.2.

The process 200 translates the received rules to heuristic table 220. The heuristic table 220 indicates the fields that are related, but may not include all the details of the rule. For the example rule of if F1 is high, then the feature vector should be labeled as class B, the process 200 indicates this rule in the heuristic table 220 by including the marker 221. The marker 221 indicates that F1 provides some indication of the class for the feature vector. For the example rule of if F2 is high and F3 is low, then the feature vector should be labeled as class A, the process 200 indicates this rule in the heuristic table 220 by including the markers 222 and 223. The process 200 may include the markers 224, 225, 226, and 227 in the heuristic table 220 based on other rules.

The process 200 generates a heuristics graph 230 based on the heuristic table 220. The heuristics graph 230 includes a node for each field of the feature vectors of the unlabeled training data 210 and an edge between relate fields as indicated by the heuristic table 220. In this example, the heuristics graph 230 includes an edge that connects the F1 node, an edge that connects the F2 and F3 nodes, an edge that connects the F2 and F5 nodes, and an edge that connects the F5 and F4 nodes.

Using the heuristics graph 230, the process 200 can identify hidden heuristics that may not be apparent from the heuristic table 220. The identified and hidden heuristics 240 includes heuristics #1 to #4 that reflect the heuristics of heuristic table 220. Based on the heuristics graph 230, the process 200 identifies heuristics #5 to #9 that reflect hidden heuristics that may not be apparent from the heuristic table 220, but are apparent from the heuristics graph 230. For example, the process 200 identifies heuristics #6 based on the connection between F3 and F5 through F2. The process 200 also identifies, for example, heuristics #7 based on the connection between F3, F2, F5, and F4.

The process 200 continues by generating a manifold 250 for the data from each of the heuristics of the identified and hidden heuristics 240. The manifold 250 illustrates the heuristic #2. The manifold 250 includes a marker for each of the numerical values for F2 and F3 for each of the feature vectors. This data is illustrated in table 255. For example, the feature vector S1 has a numerical value of 0.1 for F2 and 2.3 for F3. The process 200 places a marker at (0.1, 2.3) in the manifold 250. The process 200 places additional markers for each of the other coordinates in the table 255.

The process 200 identifies the k-nearest neighbors for each of the markers in the manifold 250 and connects each marker to the k-nearest neighbors. The process 200 generates the folded graph trajectory 257 based on the markers and the connections between the k-nearest neighbors. The process 200 calculates the trajectory for each of the markers on the manifold 250 as illustrated in the folded 1D graph column of table 260. The folded 1D graph column of table 260 may also indicate the target variable for the respective feature vector.

Based on the data in table 260 that includes each of the feature vectors and the trajectories calculated based on the manifold 250, the process performs a random forest similarity 270 on the data in table 260 to generate a matrix 280 that reflects the similarity of the feature vectors. In this example, the size of the matrix 280 is twenty by twenty because the process 200 is analyzing 200 feature vectors. The matrix 280 is a square matrix with a number of rows and columns equal to the number of feature vectors being analyzed.

The process 200 generates an additional manifold for each of the identified and hidden heuristics 240. Based on each of the additional manifolds, the process 200 generates an additional target variable for each of the feature vectors. The process 200 performs random forest similarity learning 270 on the feature vectors and the additional target variables to generate additional matrices that reflects the similarity of the feature vectors.

The process 200 combines the matrices generated from the random forest similarity learning to generate a final distance matrix. The process 200 may average the matrices to generate the final distance matrix. The process 200 uses the final distance matrix to perform graph clustering of the feature vectors to generate a plot similar to the clusters 140 of FIG. 1.

The process 200 provides the clusters to a user who assigns labels to each of the clusters. In some implementations, the process 200 automatically assigns labels to each of the clusters. Different clusters may receive the same label assignment or each different cluster may receive a different label assignment. For example, a first cluster that may include feature vectors S1, S5, S6, and S16 may receive the label class A. A second cluster that may include feature vectors S4, S7, S8, S9, and S13 may also receive the label class A. Other clusters may receive the label class B. With the feature vectors now labeled, the process 200 can perform various operations including training the model using machine learning.

Figure 3:
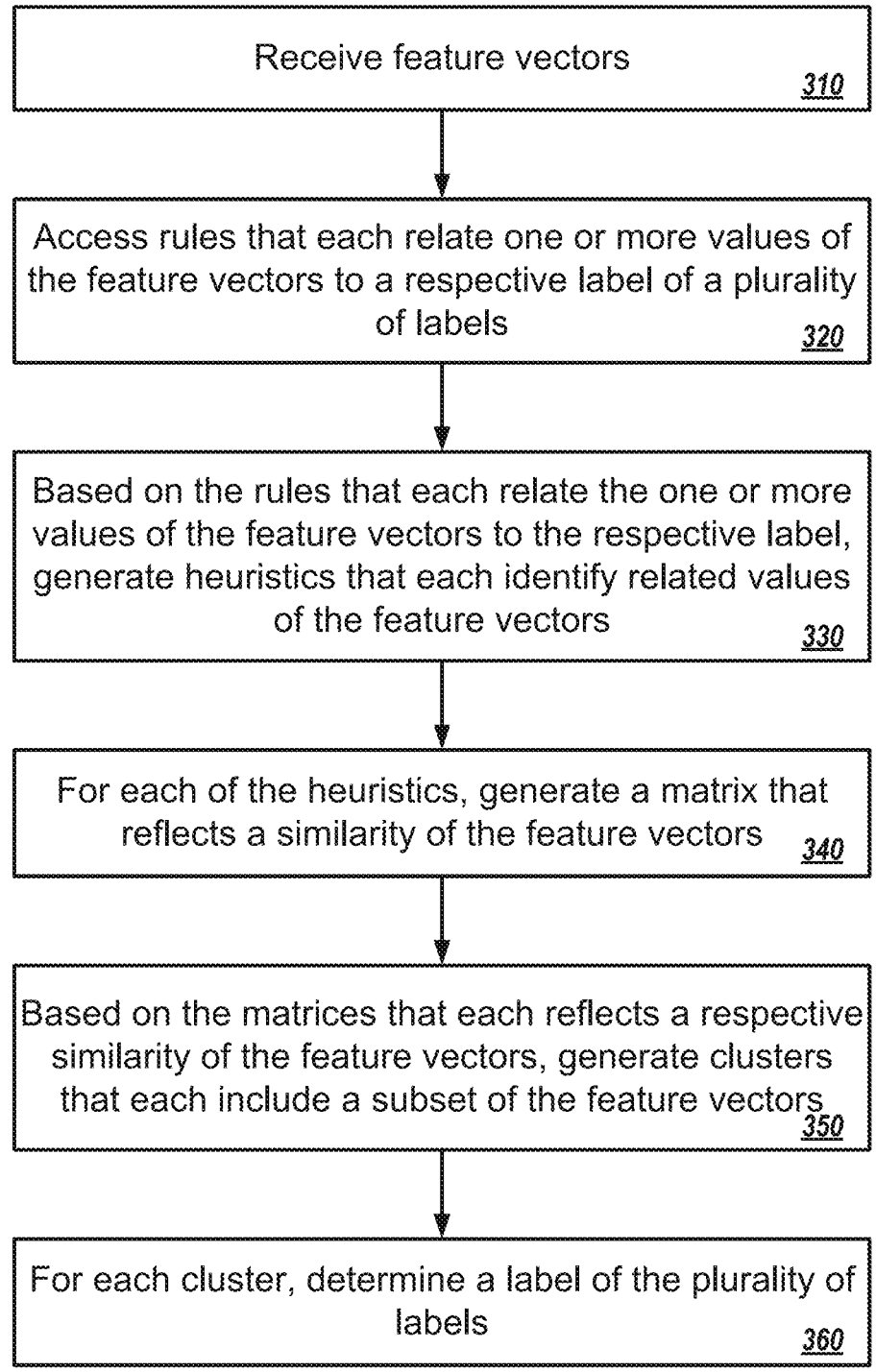
FIG. 3 is a flowchart of an example process for labeling data based on received heuristics.

FIG. 3 is a flowchart of an example process 300 for labeling data based on received heuristics. In general, the process 300 receives rules that indicate relationships between portions of the data. The process 300 generates heuristics based on those rules and groups the data into similar portions. The process 300 receives labels for each of the portions of data. The process 300 will be described as being performed by a computer system comprising one or more computers, for example, the system 100 as shown in FIG. 1.

The system receives feature vectors (310). Each feature vector includes a number of fields and a numerical value for each field. For example, one feature vector may be (0.4, 1.8, 5.9, 8.8, 3.6, 6.1), and another feature vector may be (0.4, 1.8, 5.9, 8.8, 3.6, 6.1)

The system accesses rules that each relate one or more values of the feature vectors to a respective label of a plurality of labels (320). In some implementations, the system receives the rules from a user. In some implementations, the system receives the rules from another computing device. In some implementations, the system generates the rules automatically. As an example, a rule may be that if the numerical value of a particular field is less than a threshold, then the feature vector should be labeled a particular class.

The system, based on the rules that each relate the one or more values of the feature vectors to the respective label, generates heuristics that each identify related values of the feature vectors (330). In some implementations, generating the heuristics includes generating a group of heuristics based on the rules. For example, the system may determine that a first field and a second field are related to each other based on a heuristic. The system may generate a graph based on the rules. The graph may include nodes for each field and edges that connect the fields that are related according to the rules. The system may identify additional heuristics based on the graph by identifying fields, or nodes, that are related to each other through an intervening field, or node. These additional related fields are additional heuristics.

The system, for each of the heuristics, generates a matrix that reflects a similarity of the feature vectors (340). In some implementations, the system generates the matrices using random forest similarity. In some implementations, the number of rows and columns of the matrices is equal to a number of feature vectors. In some implementations, the system generates the matrix by generating a manifold of numerical values of the related values, or related fields. The system generates the matrix based on the manifold.

The system, based on the matrices that each reflects a respective similarity of the feature vectors, generates clusters that each include a subset of the feature vectors (350). The system, for each cluster, determines a label of the plurality of labels (360). In some implementations, the system receives the labels for each cluster from a user. In some implementations, the system generates the labels automatically. In some implementations, the system trains a model using machine learning and using the labeled clusters.

Figure 4:
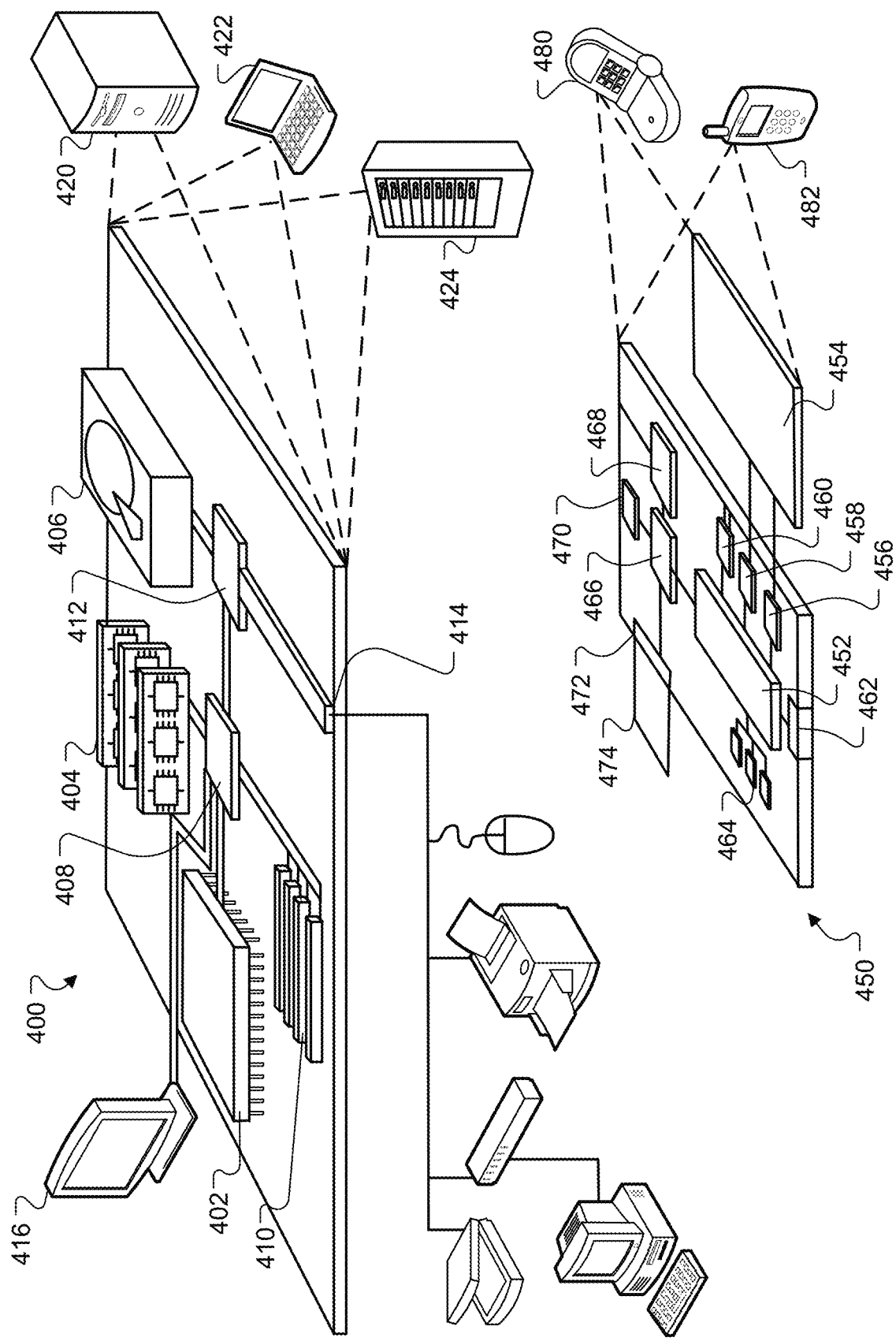
FIG. 4 illustrates an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various buses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver. In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows described in the application do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims. Also, a feature described in one aspect or implementation may be applied in any other aspect or implementation.

What is claimed is:

1. A computer-implemented method comprising:
   receiving, by a computing device, feature vectors;
   accessing, by the computing device, rules that each relate one or more values of the feature vectors to a respective label of a plurality of labels;
   based on the rules that each relate the one or more values of the feature vectors to the respective label, generating, by the computing device, a heuristics table comprising a set of rows and a set of columns, each row representing a value of the feature vectors and each column representing a value of the feature vectors, cells of the heuristics table being populated by a marker, cells being populated by one of the markers, each marker indicating a relationship between values of the feature vectors based on a rule;
   providing, the computing device, a heuristics graph based on markers of the heuristics table;
   generating, by the computing device, a set of heuristics based on the heuristics table and the heuristics graph, each heuristic in the set of heuristics identifying related values of the feature vectors, the set of heuristics comprising at least two heuristics;
   providing a set of matrices by, for each heuristic in the set of heuristics, generating a matrix that reflects a similarity of the feature vectors;
   generating, by the computing device, clusters that each include a subset of the feature vectors at least partially by aggregating the matrices in the set of matrices; and
   for each cluster, determining, by the computing device, a label of the plurality of labels.

2. The method of claim 1, comprising:
   training, by the computing device, a model using machine learning, the feature vectors, and the determined labels.

3. The method of claim 1, wherein generating the set of heuristics comprises:
   based on the rules that each relate the one or more values of the feature vectors to the respective label, generating a first group of heuristics; and
   based on the first group of heuristics, generating a second group of heuristics, wherein the heuristics include the first group of heuristics and the second group of heuristics.

4. The method of claim 3, wherein generating the second group of heuristics comprises:
   based on the first group of heuristics, generating the heuristics graph to include a node for each value of the feature vectors and edges that connect one or more values of each rule;
   identifying groups of nodes connected through intervening nodes; and
   generating the second group of heuristics based on the groups of nodes connected through the intervening nodes.

5. The method of claim 1, wherein:
   accessing the rules that each relate the one or more values of the feature vectors to the respective label of the plurality of labels comprises:
      receiving the rules that each relate the one or more values of the feature vectors to the respective label of the plurality of labels from an additional computing device, and
   determining the label of the plurality of labels comprises:
      receiving, from the additional computing device, the label of the plurality of labels.

6. The method of claim 1, wherein each matrix in the set of matrices has a number of rows and columns that equal a quantity of the feature vectors.

7. The method of claim 1, wherein each matrix in the set of matrices is generated using random forest similarity.

8. The method of claim 1, wherein generating the set of matrices comprises:
   for each heuristic in the set of heuristics, generating a manifold of numerical values of the related values; and
   generating a matrix based on the manifold of the numerical values of the related values.

9. A system comprising:
   one or more computers; and
   one or more storage devices storing instructions that are operable, when executed by the one or more computers, to cause the one or more computers to perform operations comprising:
      receiving feature vectors;

accessing rules that each relate one or more values of the feature vectors to a respective label of a plurality of labels;

based on the rules that each relate the one or more values of the feature vectors to the respective label, generating a heuristics table comprising a set of rows and a set of columns, each row representing a value of the feature vectors and each column representing a value of the feature vectors, cells of the heuristics table being populated by a marker, cells being populated by one of the markers, each marker indicating a relationship between values of the feature vectors based on a rule;

providing a heuristics graph based on markers of the heuristics table;

generating a set of heuristics based on the heuristics table and the heuristics graph, each heuristic in the set of heuristics identifying related values of the feature vectors, the set of heuristics comprising at least two heuristics;

providing a set of matrices by, for each heuristic in the set of heuristics, generating a matrix that reflects a similarity of the feature vectors;

generating clusters that each include a subset of the feature vectors at least partially by aggregating the matrices in the set of matrices; and for each cluster, determining a label of the plurality of labels.

10. The system of claim 9, wherein the operations comprise:
training, by the computing device, a model using machine learning, the feature vectors, and the determined labels.

11. The system of claim 9, wherein generating the set of heuristics comprises:
based on the rules that each relate the one or more values of the feature vectors to the respective label, generating a first group of heuristics; and
based on the first group of heuristics, generating a second group of heuristics, wherein the heuristics include the first group of heuristics and the second group of heuristics.

12. The method of claim 11, wherein generating the second group of heuristics comprises:
based on the first group of heuristics, generating the heuristics graph to include a node for each value of the feature vectors and edges that connect one or more values of each rule;
identifying groups of nodes connected through intervening nodes; and
generating the second group of heuristics based on the groups of nodes connected through the intervening nodes.

13. The system of claim 9, wherein:
accessing the rules that each relate the one or more values of the feature vectors to the respective label of the plurality of labels comprises:
receiving the rules that each relate the one or more values of the feature vectors to the respective label of the plurality of labels from an additional computing device, and
determining the label of the plurality of labels comprises:
receiving, from the additional computing device, the label of the plurality of labels.

14. The system of claim 9, wherein each matrix in the set of matrices has a number of rows and columns that equal a quantity of the feature vectors.

15. The system of claim 9, wherein each matrix in the set of matrices is generated using random forest similarity.

16. The system of claim 9, wherein generating the set of matrices comprises:
for each heuristic in the set of heuristics, generating a manifold of numerical values of the related values; and
generating a matrix based on the manifold of the numerical values of the related values.

17. A non-transitory computer-readable medium storing software comprising instructions executable by one or more computers which, upon such execution, cause the one or more computers to perform operations comprising:
receiving feature vectors;
accessing rules that each relate one or more values of the feature vectors to a respective label of a plurality of labels;
based on the rules that each relate the one or more values of the feature vectors to the respective label, generating a heuristics table comprising a set of rows and a set of columns, each row representing a value of the feature vectors and each column representing a value of the feature vectors, cells of the heuristics table being populated by a marker, cells being populated by one of the markers, each marker indicating a relationship between values of the feature vectors based on a rule;
providing a heuristics graph based on markers of the heuristics table;
generating a set of heuristics based on the heuristics table and the heuristics graph, each heuristic in the set of heuristics identifying related values of the feature vectors, the set of heuristics comprising at least two heuristics;
providing a set of matrices by, for each heuristic in the set of heuristics, generating a matrix that reflects a similarity of the feature vectors;
generating clusters that each include a subset of the feature vectors at least partially by aggregating the matrices in the set of matrices; and
for each cluster, determining a label of the plurality of labels.

18. The medium of claim 17, wherein the operations comprise:
training, by the computing device, a model using machine learning, the feature vectors, and the determined labels.

19. The medium of claim 17, wherein generating the set of heuristics comprises:
based on the rules that each relate the one or more values of the feature vectors to the respective label, generating a first group of heuristics; and
based on the first group of heuristics, generating a second group of heuristics, wherein the heuristics include the first group of heuristics and the second group of heuristics.

20. The medium of claim 17, wherein:
accessing the rules that each relate the one or more values of the feature vectors to the respective label of the plurality of labels comprises:
receiving the rules that each relate the one or more values of the feature vectors to the respective label of the plurality of labels from an additional computing device, and
determining the label of the plurality of labels comprises:
receiving, from the additional computing device, the label of the plurality of labels.

* * * * *